US011280399B2

(12) United States Patent
Leimann

(10) Patent No.: US 11,280,399 B2
(45) Date of Patent: Mar. 22, 2022

(54) DEFORMATION-OPTIMIZED PLANET PIN

(71) Applicants: ZF Friedrichshafen AG, Friedrichshafen (DE); ZF Wind Power Antwerpen N.V., Lommel (BE)

(72) Inventor: Dirk Leimann, Edegem (BE)

(73) Assignees: ZF FRIEDRICHSHAFEN AG, Friedrichshafen (DE); ZF WIND POWER ANTWERPEN N.V., Lommel (BE)

(*) Notice: Subject to any disclaimer, the term of this patent is extended or adjusted under 35 U.S.C. 154(b) by 1 day.

(21) Appl. No.: 17/257,323

(22) PCT Filed: Jun. 3, 2019

(86) PCT No.: PCT/EP2019/064281
§ 371 (c)(1),
(2) Date: Dec. 31, 2020

(87) PCT Pub. No.: WO2020/007544
PCT Pub. Date: Jan. 9, 2020

(65) Prior Publication Data
US 2021/0131553 A1    May 6, 2021

(30) Foreign Application Priority Data
Jul. 6, 2018  (DE) .................... 10 2018 211 161.8

(51) Int. Cl.
*F16H 57/08*   (2006.01)
*F16H 1/28*    (2006.01)

(52) U.S. Cl.
CPC .................. *F16H 57/082* (2013.01)

(58) Field of Classification Search
CPC ....... F16H 57/08; F16H 57/082; F16H 1/2836
See application file for complete search history.

(56) References Cited

U.S. PATENT DOCUMENTS 5,597,370 A * 1/1997 Nogle ................. F16C 33/6637
                                                184/6.12
8,113,986 B2 * 2/2012 Hahlbeck ............. F16H 1/2836
                                                475/347
8,313,412 B2 * 11/2012 Montestruc ........... F16H 1/2836
                                                475/346
(Continued)

FOREIGN PATENT DOCUMENTS

DE      19706686 A1    8/1998
JP      H07293557 A    11/1995
JP      H09177758 A    7/1997

*Primary Examiner* — Tinh Dang
(74) *Attorney, Agent, or Firm* — Leydig, Voit & Mayer, Ltd.

(57) ABSTRACT

A planet pin includes a center axis and an outer contour that runs at a distance r(x) from the center axis. The distance r(x) is dependent on an axial position x in at least one longitudinal portion. For at least one axial position interval [x1, x2], the distance r(x), for all x∈[x1, x2], of the outer contour from the center axis is r(x)=l(x)+g(x)+o(x), where l(x) is a linear function, g is constantly zero or convex on the interval [x1, x2], and o(x0)=0 applies for at least one x0∈]x1, x2[. The function o is concave on the interval [x1, x0], convex on the interval [x0, x2], and decreasing in x0.

15 Claims, 2 Drawing Sheets

(56) References Cited

U.S. PATENT DOCUMENTS

| | | | |
|---|---|---|---|
| 8,777,802 B2* | 7/2014 | Erno | F16H 57/082 |
| | | | 475/346 |
| 8,790,213 B1 | 7/2014 | Isayama et al. | |
| 2009/0286645 A1* | 11/2009 | Hahlbeck | F16H 1/2836 |
| | | | 475/347 |
| 2010/0197444 A1 | 8/2010 | Montestruc | |
| 2010/0197445 A1* | 8/2010 | Montestruc | F16H 1/2836 |
| | | | 475/346 |

* cited by examiner

DEFORMATION-OPTIMIZED PLANET PIN

CROSS REFERENCE TO RELATED APPLICATIONS

This application is a U.S. National Phase Application under 35 U.S.C. § 371 of International Application No. PCT/EP2019/064281, filed on Jun. 3, 2019, and claims benefit to German Patent Application No. DE 10 2018 211 161.8, filed on Jul. 6, 2018, 20. The International Application was published in German on Jan. 9, 2020 as WO 2020/007544 under PCT Article 21(2).

FIELD

The disclosure relates to a planet pin having an outer contour that runs at a distance from a center axis of the planet that depends on an axial position in at least one longitudinal portion.

BACKGROUND

Planet pins, i.e., pins which are fixed in a planet carrier in order to mount planet gears, are generally subject to deformations. Deformations can result, for example, from forces which occur in the toothing of the planet gears or from loads due to torques that the planet carrier has to transmit.

The deformations of the planet pin are in particular critical in the case of planet gears mounted in a plain bearing. The wear-free operation of a plain bearing requires a lubricating film to be present over a large area. However, deformations lead to the lubricating film breaking down locally, so that the bearing shells come into contact and friction between solids arises. The consequence is increased wear at the corresponding locations.

Publications U.S. Pat. No. 8,790,213 B1 and JP-H 09 177 758 A1 disclose plain bearings whose running surface has a spherical contour. As a result, deflections, which can be caused, for example, by radially acting forces, are compensated for. However, deformations caused by axially acting forces are not compensated for.

Loads occurring in planetary transmissions are accompanied by S-shaped deformations of the planet pins. Such deformations are particularly pronounced in highly loaded transmissions of wind turbines. Solutions for compensating S-shaped deformations have not been known to date.

SUMMARY

In an embodiment, the present invention provides a planet pin. The planet pin includes a center axis and an outer contour that runs at a distance $r(x)$ from the center axis. The distance $r(x)$ is dependent on an axial position $x$ in at least one longitudinal portion. For at least one axial position interval $[x1, x2]$, the distance $r(x)$, for all $x \in [x1, x2]$, of the outer contour from the center axis is $r(x)=l(x)+g(x)+o(x)$, where $l(x)$ is a linear function, $g$ is constantly zero or convex on the interval $[x1, x2]$, and $o(x0)=0$ applies for at least one $x0 \in ]x1, x2[$. The function $o$ is concave on the interval $[x1, x0]$, convex on the interval $[x0, x2]$, and decreasing in $x0$.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
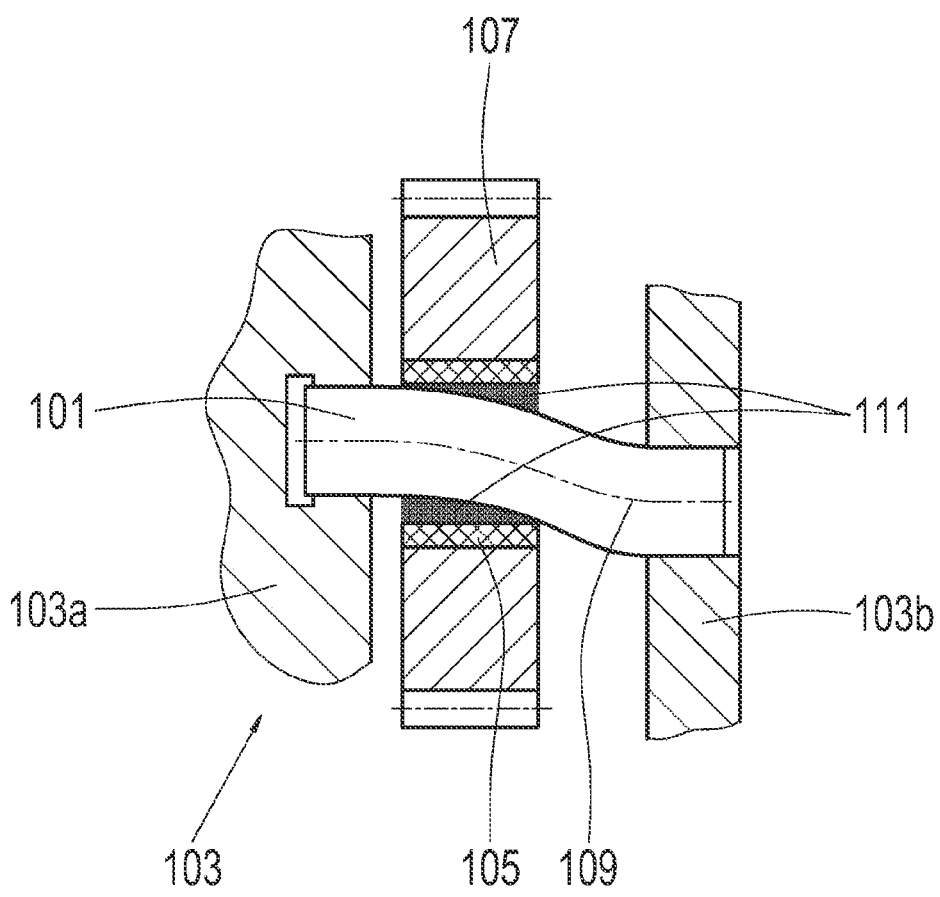
FIG. 1 illustrates a conventional planet pin.

The disclosure provides for improving the wear resistance of planet gears mounted in a plain bearing.

The disclosure provides a targeted correction of an outer contour of the planet pin in at least one longitudinal portion. The longitudinal portion is a sectional representation defined in accordance with DIN ISO 128-40 and DIN ISO 128-50. In the present case, the sectional plane is oriented such that it contains a center axis of a planet gear fixed or mounted on the planet pin. The center axis is identical to an axis of rotation of the planet gear.

The center axis runs through the planet pin and exclusively intersects the planet pin in points that represent a centroid of a sectional surface oriented orthogonally to the center axis. In the case of a rotationally symmetrical planet pin, its axis of symmetry is simultaneously the center axis.

The outer contour consists of the body edges of the planet pin in the unloaded state. The planet pin assumes the unloaded state when no forces act on it.

The outer contour of the planet pin is described by a function $r(x)$. In dependence on the axial position $x$, the outer contour runs at a distance $r(x)$ from the center axis of the planet pin. This means that at least a portion of the outer contour is a graph of the function $r(x)$. The axial position refers to a point of the center axis. This point is defined by a distance $x$ from a reference point also lying on the center axis. Orthogonally thereto, a point of the outer contour is located at a distance $r(x)$.

According to embodiments, $r(x)$ is composed of three partial functions over at least one interval $[x_1, x_2]$ as follows:

$$r(x)=l(x)+g(x)+o(x),$$

for all $x \in [x_1, x_2]$, where $l(x)$ is a linear function. $x_1$ can be approximately $=0$, so that the aforementioned reference point is at $x_1$.

The function $g$ is convex on the interval $[x_1, x_2]$. The linear course of the outer correction of the planet pin is thus provided with a convex correction by the function $g$.

In order to compensate for an S-shaped deformation of the planet pin, an additional, S-shaped correction takes place. A corresponding correction function $o$ runs in an S-shape. In detail, $o(x_0)=0$ for at least one $x_0 \in ]x_1, x_2[$, wherein the function $o$ is concave on the interval $[x_1, x_0]$, convex on the interval $[x_0, x_2]$, and decreasing in $x_0$, i.e., the following applies: $o'(x_0)<0$.

In a preferred development, the function $g$ is continuous and/or the function $o$ is continuous.

The function $l$ in another preferred embodiment is positive on the interval $[x_1, x_2]$. $l$ may be refined as a constant function or as a decreasing function, where $l(x_1)>l(x_2)$.

In a preferred development, the function $g$ has a minimum on the interval $]x_1, x_2[$.

In particular, $g$ may be negative on the interval $]x_1, x_2[$. This means, that for all $x \in ]x_1, x_2[$, the following applies: $g(x)<0$.

In another preferred development, the following applies:

$$g(x_1)=g(x_2)=0.$$

The function g is preferably greater than −l on the interval $[x_1, x_2]$. This means that for all $x \in [x_1, x_2]$, the following applies:

$$g(x) > -l(x).$$

Moreover, preferred is a mirror-symmetrical development of g on the interval $[x_1, x_2]$. In this case, for all $x \in [x_1, \frac{1}{2}(x_1+x_2)]$, the following applies:

$$r(x)=r(x_1+x_2-x)$$

In a preferred development, the function o has a maximum on the interval $[x_1, x_0]$.

Positive values of the function o on the interval $[x_1, x_0[$ are also preferred.

On the interval $[x_0, x_2]$, the function o has a minimum in another preferred development.

On the interval $[x_0, x_2]$, negative values of the function o are preferred.

In another preferred development, the following applies:

$$o(x_1)=o(x_2)=0.$$

The planet pin 101 shown in FIG. 1 is fixed in a planet carrier 103. A planet gear 107 is rotatably mounted on the planet pin 101 by means of a slide bearing 105.

The planet carrier 103 deforms due to the loads occurring during operation. A first cheek 103a and a second cheek 103b of the planet carrier 103 move in relation to one another. This leads to an S-shaped deformation of the planet pin 101. Consequently, a center axis 109 of the planet pin 101 runs in an S-shape. Since the planet pin is cylindrical in the unloaded state, its axial body edges run in parallel to the center axis 109 and thus also in an S-shape in the loaded state.

The deformations of the planet pin 101 act on a bearing gap 111 of the plain bearing 105. The bearing gap increases in some places as a result of the S-shaped course of the outer contour. In some places, it decreases. Friction between solids occurs in the regions with a reduced bearing gap. This leads to locally increased wear.

Figure 2:
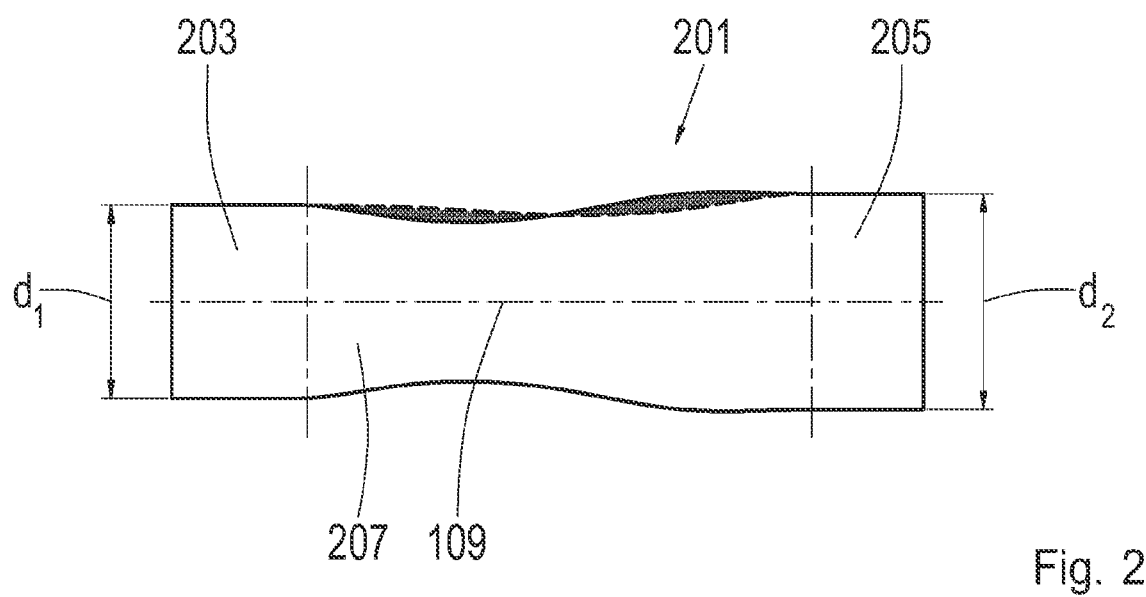
FIG. 2 illustrates a deformation-optimized planet pin.

A deformation-optimized planet pin 201 is shown in FIG. 2. The contour of the planet pin 201 is corrected in such a way that an S-shaped deformation is compensated for to the greatest extend possible. This can be achieved by an S-shaped course of the outer contour. The course of the outer contour corresponds to a flattened negative profile of the S-shaped course of the center axis 109 in the loaded state.

The planet pin 201 consists of three portions: a first end portion 203, a second end portion 205, and a center portion 207. The center portion 207 is arranged axially between the first end portion 203 and the second end portion 205 and connects both end portions 203, 205 to one another. The end portions 203, 205 serve to respectively fix the planet pin 201 in a cheek of a planet carrier. Accordingly, the end portions 203, 205 are cylindrical.

A diameter $d_1$ of the first end portion 203 is smaller than a diameter $d_2$ of the second end portion 205.

Starting from a basic shape of the center portion 207, which is conical due to the different diameters of the end portions 203, 205, a deformation-optimized correction of the planet pin 201 takes place in two steps: In a first step, the contour of the center portion 207 is modified in such a way that a concave course results. For this purpose, the frusto-conical center portion 207 is superimposed with a concave correction function. The concave correction after the first step is shown in dashed lines in FIG. 2.

In a second step, an S-shaped correction of the concave center portion 207 takes place. For this purpose, the contour of the concave center portion 207 is superimposed with an S-shaped correction function. The S-shaped correction function brings about an enlargement of the indentation of the first end piece 203 and a reduction of the indentation of the second end piece 205.

The application of the first step and of the second step for the deformation-optimized correction of the planet pin 203 consists of calculation methods. The contour that results as the result of the calculation method is ultimately manufactured.

Figure 3:
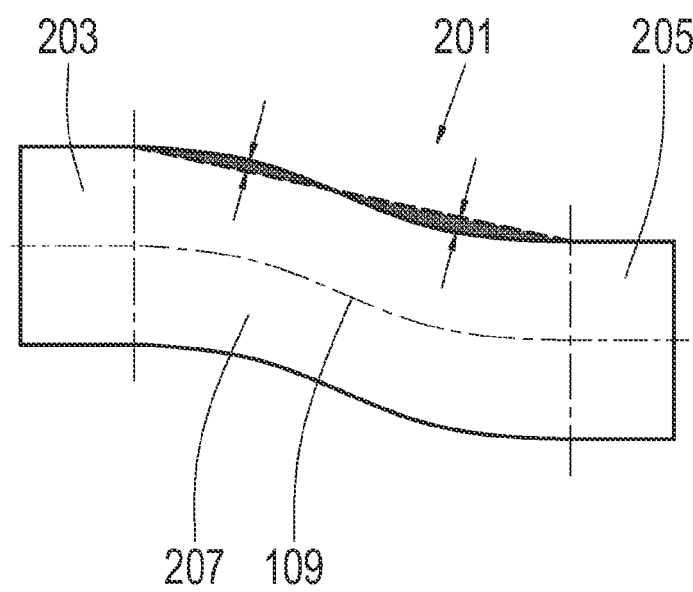
FIG. 3 illustrates a deformation-optimized planet pin in the loaded state.

FIG. 3 shows the deformation-optimized planet pin 203 in the loaded state. In this case, the course of the center axis 109 corresponds to the course shown in FIG. 1.

The hypothetical course of the outer contour of the planet pin 201 without corrections is shown by dashed lines in FIG. 3 for the purpose of illustration. This course corresponds to the course of the outer contour of the planet pin 101 shown in FIG. 1. It can be seen that the corrections described above lead to a straightened course of the outer contour. This causes a more uniform course of the bearing gap 111.

While the subject matter of the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS

101 Planet pin
103 Planet carrier
103a Cheek
103b Cheek
105 Plain bearing
107 Planet gear
109 Center axis
111 Bearing gap
201 Planet pin

The invention claimed is:

1. A planet pin, comprising:
   a center axis; and
   an outer contour that runs at a distance r(x) from the center axis, the distance r(x) being dependent on an axial position x in at least one longitudinal portion;
   wherein for at least one axial position interval $[x_1, x_2]$, the distance r(x), for all $x \in [x_1, x_2]$, of the outer contour from the center axis is:

$$r(x)=l(x)+g(x)+o(x),$$

wherein l(x) is a linear function;
   wherein g is constantly zero or convex on the interval $[x_1, x_2]$;
   wherein $o(x_0)=0$ applies for at least one $x_0 \in ]x_1, x_2[$;
   wherein the function o is concave on the interval $[x_1, x_0]$, convex on the interval $[x_0, x_2]$, and wherein the derivative o' of the function o is negative at the axial position $x_0$;
   wherein the planet pin is configured to be fixed in a planet carrier of a planetary gearset; and
   wherein the planet pin is configured to have a planet gear of the planetary gearset be rotatably mounted thereon.

2. The planet pin according to claim 1, wherein at least one of the function g and the function o is continuous.

3. The planet pin according to claim 1, wherein the function l is positive on the interval $[x_1, x_2]$.

4. The planet pin according to claim 1, wherein l is a constant function.

5. The planet pin according to claim 1, wherein $l(x_1) > l(x_2)$.

6. The planet pin according to claim 1, wherein the function g has a minimum on the interval $]x_1, x_2[$.

7. The planet pin according to claim 1, wherein values of the function g are negative on the interval $]x_1, x_2[$.

8. The planet pin according to claim 1, wherein $g(x_1)=g(x_2)=0$.

9. The planet pin according to claim 1, wherein for all $x \in [x_1, x_2]$, $g(x) > -l(x)$.

10. The planet pin according to claim 1, wherein the function g is mirror-symmetrical on the interval $[x_1, x_2]$.

11. The planet pin according to claim 1, wherein the function o has a maximum on the interval $[x_1, x_0]$.

12. The planet pin according to claim 1, wherein the values of the function o are positive on the interval $[x_1, x_0]$.

13. The planet pin according to claim 1, wherein the function o has a minimum on an interval $[x_0, x_2]$.

14. The planet pin according to claim 1, wherein the values of the function o are negative on an interval $[x_0, x_2]$.

15. The planet pin according to claim 1, wherein $o(x_1)=o(x_2)=0$.

* * * * *